United States Patent
Lockledge et al.

[11] Patent Number: 6,096,820
[45] Date of Patent: Aug. 1, 2000

[54] ALUMINOSILICATE STABILIZED HALOGENATED POLYMERS

[75] Inventors: Scott Potter Lockledge, Blue Bell; Roman Wypart, East Norriton, both of Pa.

[73] Assignee: PQ Corporation, Berwyn, Pa.

[21] Appl. No.: 09/363,337

[22] Filed: Jul. 29, 1999

[51] Int. Cl.$^7$ .................................................... C08R 3/34
[52] U.S. Cl. ................................................................ 524/450
[58] Field of Search .............................................. 524/450

[56] References Cited

U.S. PATENT DOCUMENTS

| | | | |
|---|---|---|---|
| 2,867,605 | 1/1959 | Safford | 524/450 |
| 3,245,946 | 4/1966 | O'Connor et al. | 523/211 |
| 4,000,100 | 12/1976 | Baldyga | 524/147 |
| 4,307,010 | 12/1981 | Sandler et al. | 524/450 |
| 4,338,226 | 7/1982 | Worschech et al. | 524/302 |
| 4,371,656 | 2/1983 | Kashiwashe et al. | 524/450 |
| 4,425,448 | 1/1984 | Concannon et al. | 524/450 |
| 4,487,810 | 12/1984 | Ascarelli et al. | 524/450 |
| 4,590,233 | 5/1986 | Erwied et al. | 524/357 |
| 4,686,255 | 8/1987 | Erwied et al. | 524/450 |
| 4,741,779 | 5/1988 | Mita et al. | 524/450 |
| 4,758,619 | 7/1988 | Mita et al. | 524/450 |
| 4,965,309 | 10/1990 | Batdorf | 524/450 |
| 5,004,776 | 4/1991 | Tadenuma et al. | 524/377 |
| 5,073,584 | 12/1991 | Meszaros et al. | 524/101 |
| 5,133,899 | 7/1992 | Nakazawa et al. | 252/400.3 |
| 5,141,980 | 8/1992 | Ranceze et al. | 524/399 |
| 5,216,058 | 6/1993 | Visneski | 524/357 |
| 5,350,785 | 9/1994 | Sander et al. | 524/100 |
| 5,492,949 | 2/1996 | Drewes et al. | 524/114 |
| 5,519,077 | 5/1996 | Drewes et al. | 524/114 |
| 5,582,873 | 12/1996 | Desai | 524/450 |
| 5,739,188 | 4/1998 | Desai | 524/140 |
| 5,814,691 | 9/1998 | Kuhn et al. | 524/102 |

FOREIGN PATENT DOCUMENTS

| | | |
|---|---|---|
| 8928757 | 1/1990 | Australia . |
| 8901033 | 10/1989 | Brazil . |
| 2180208 | 12/1996 | Canada . |
| 54034356 | 8/1977 | Japan . |
| 56043341 | 9/1979 | Japan . |
| 55-164236 | 12/1980 | Japan . |
| 61-243849 | 4/1985 | Japan . |
| 62034940 | 8/1985 | Japan . |
| 62070432 | 9/1985 | Japan . |
| 60-233141 | 11/1985 | Japan . |
| 03093814 | 9/1989 | Japan . |
| 03195755 | 12/1989 | Japan . |
| 3054241 | 3/1991 | Japan . |
| 03076740 | 4/1991 | Japan . |
| 1682365 | 10/1991 | Russian Federation . |

*Primary Examiner*—Peter A. Szekely
*Attorney, Agent, or Firm*—Ratner & Prestia

[57] ABSTRACT

The present invention describes halogenated polymer resins stabilized with a stabilizer comprising a synthetic crystalline aluminosilicate of the formula $M_{2/n}O.Al_2O_3.ySiO_2.wH_2O$, in which M is a charge balancing cation, n is the valence of M and is 1 or 2, y is the number of moles of $SiO_2$ per mole of $Al_2O_3$, and is 1.85 to 15 with a preferred range of about 2 to 5, and w is the moles of water of hydration per molecule of said aluminosilicate, wherein said aluminosilicate has a mean crystallite size in the range of about 0.01 μm to about 1 μm and a mean particle size in the range of about 0.1 to 10 μm. Also described is a method for stabilizing halogenated polymers such as PVC and CPVC by incorporating said aluminosilicate into a formulation thereof.

32 Claims, No Drawings

ALUMINOSILICATE STABILIZED HALOGENATED POLYMERS

BACKGROUND OF THE INVENTION

This invention relates to stabilizing halogenated polymers and to an improved method for stabilization thereof. More particularly, the invention relates to thermal stabilization of halogenated polymer resins that are normally processed at elevated temperatures into formed articles. In particular, the invention relates to thermal stabilization of such resins with certain synthetic crystalline aluminosilicates or zeolite molecular sieves prepared specifically for this purpose.

Halogen containing polymers, such as polyvinyl chloride (PVC), chlorinated polyvinyl chloride (CPVC) and other chlorine, fluorine, or bromine containing polymers which are formed above about 150° C. tend to degrade and discolor unless stabilized, even when held at these temperatures for the relatively short period of time required for processing. When this occurs, the polymer is either unusable or a high rejection rate for produced articles results, and the ability to reuse scrap material from the formation process is seriously impaired.

Subsequent to processing such resins, articles made from such halogenated polymers, unless stabilized and properly pigmented, also tend to deteriorate, become brittle and crack or shatter upon prolonged exposure to sunlight or other ultraviolet rays, thereby becoming useless for their intended purpose.

These resins in their unstabilized form also tend to plate out on processing equipment, for example on dies and mill or calendar rolls, as the material is being formed into a finished article. This causes imperfections in articles made from such resins and tends to require frequent cleaning of processing equipment used for handling such materials, resulting in inefficiencies in production as well. For example, processing of unstabilized PVC at elevated temperatures rapidly results in degradation whose symptoms are discoloration, elimination of hydrogen chloride, and irreversible adhesion to the processing equipment surfaces.

While all mechanisms for these instabilities are not precisely known, the thermal degradation and perhaps the other indicated forms of instability of halogenated polymers, particularly polyvinyl chloride (PVC) or chlorinated polyvinyl chloride (CPVC), is manifested in the evolution of HCl. It is widely known that HCl catalyzes further degradation. Prevention of this degradation requires keeping HCl at very low concentrations and/or neutralizing it during processing.

Traditional methods for stabilizing halogenated polymers such as PVC have focused on the use of various inorganic, organometallic and organic stabilizers. Inorganic stabilizers that have been used include for example dibasic, tribasic, and tetrabasic lead sulfate; dibasic lead phosphite; and white lead. Organometallic stabilizers commonly used include organic adducts of such heavy metals as barium, cadmium, lead, tin, magnesium, antimony, and/or zinc, frequently in admixture with other co-stabilizers and other conventional additives. Organic stabilizers that have been used include for example, calcium soaps, polyhydric esters of various fatty acids, phosphites, thioesters, beta-diketones and the like, alone or in combination with such organometallic compounds as stabilizers for such resins.

Aluminosilicates or zeolite molecular sieves have also been suggested for use as stabilizers for PVC. For example, U.S. Pat. No. 3,245,946 discloses the use of activated Zeolite A as a stabilizer for PVC resin. And U.S. Pat. No. 4,000,100 discloses the use of an unactivated Zeolite 3A, 4A, or 5A molecular sieve in combination with a conventional organometallic or organic stabilizer mixture. It also known to utilize a complex system of primary and secondary stabilizers, including as one component of the stabilization system, a powdered, crystalline, synthetic hydrous aluminosilicate having a water content in the range of 13 to 25% as water of crystallization, as disclosed in U.S. Pat. No. 4,590,233

Among the prior art utilizing zeolites or aluminosilicates as part of a stabilization system for PVC resin, focus has been on such factors as the level of water of crystallization, and/or on pore size of the aluminosilicate. Preferred particle size ranges of zeolites are also described. Presumably certain size ranges give optimal dispersion and enhanced physical properties such as tensile strength and modulus as is known with other solid polymer additives such as calcium carbonate.

However, we are not aware of any prior art disclosure which establishes or suggests a direct correlation between reduction in particle size and enhancement of thermal stability. Nor are aware of any significance attached in prior art disclosures to the distinction made with respect to this invention between particle size and crystallite size. Conventional zeolites consist of small cubic or prismatic crystallites and/or other geometric forms such as rhombic, dodecahedral, spherulites, octahedral etc., and combinations and intergrowths thereof, that agglomerate into particles. The degree of agglomeration and/or inter-growth determines the particle size distribution, which is typically determined by a light scattering or other spectroscopic technique, whereas crystallite size is virtually independent of particle size and is typically determined by scanning electron microscopy images. As an example of this distiniction, zeolite 4A and faujasite-type zeolites currently offered on the market typically have a crystallite size of about 1.0 to 5.0 microns with a mean particle size of about 3.0 to 10.0 or more microns. Moreover, while the prior art does recognize methods for reducing particle size, it does not discuss preparative procedures for the small crystallite zeolites as claimed in the present application.

While the use of factors such as complex stabilization systems and activation of zeolites has resulted in substantial improvement in the ability of aluminosilicates to stabilize PVC resins, still further improvements are required, particularly in the level of thermal stabilization for PVC, CPVC, and other halogenated polymers.

Accordingly, it is the primary object of this invention to provide an improvement in the thermal stability of halogenated polymer molding resins such as PVC, CPVC, and other halogenated polymers utilized for forming articles at elevated temperature.

BRIEF SUMMARY OF THE INVENTION

It has now been found that these and other improvements in the stability of halogenated polymer resins are obtained in accordance with the present invention by utilizing as a stabilizing component of such halogenated polymers an aluminosilicate in which the individual crystals have a fine crystallite size in the range of about 0.01 µm to about 1.0 µm Surprisingly it has now been found that while particle size is important in the maintenance of physical properties of halogenated polymer systems, utilization of an aluminosilicate having a fine crystallite size is critical to obtaining further improvements in thermal stabilization of these polymers. Such fine crystallite particle size stabilizers will normally be employed in combination with conventional inorganic, organometallic, or organic co-stabilizers.

DETAILED DESCRIPTION OF THE INVENTION

In general, the present invention comprises a stabilized halogenated polymer composition comprising a halogenated polymer resin and a stabilizing amount of a synthetic crystalline aluminosilicate having a fine mean crystallite size in the range of about 0.01 $\mu$m to about 1.0 $\mu$m and preferably a mean crystallite size in the range of about 0.2 to 1 $\mu$m and most preferably in the range of 0.2 to about 0.85 $\mu$m. While crystallite size is critical to the present invention, particle size may vary within a wide range, but it is preferable to employ particles having a mean particle size in the range of about 0.1 to about 5.0 $\mu$m. Also included in the present invention is a method for stabilizing such compounds by admixing the halogenated polymer with the foregoing aluminosilicate, alone or in combination with conventional inorganic, organometallic, and/or organic co-stabilizers.

Polymer resins suitable for use in the present invention are halogenated polymer resins including but not limited to, polyvinyl chloride (PVC), chlorinated polyvinyl chloride (CPVC), polychloroprene (Neoprene), an acrylonitrile-vinyl chloride copolymer (Dynel), a polyvinyl chloride-vinyl acetate copolymer, polyvinylidene chloride, a polytetrafluoroethylene-vinyl chloride copolymer, or a polyfluoro-chloro ethylene polymer, most preferably a halogenated vinyl polymer resin. Polyvinyl chloride and chloropolyvinyl chloride are particularly preferred resins for use in the present invention.

The PVC used for this invention may be one of several types; its properties can vary depending on the polymerization method and polymerization temperature. The higher the polymerization temperature, the lower the molecular weight of PVC that is produced. Typical PVC resins have a number average molecular weight in the range of 20,000 to 100,000 and a Fikentscher K value ranging from 41 to 98. Certain molecular weight PVC resins show optimum physical properties and process performance for particular applications. Generally, suspension PVC resins are more thermally stable than PVC resins produced by mass or emulsion polymerization. Depending on the polymerization method and manufacturing conditions, PVC can vary in resin particle size and porosity and may perform differently in the same formulation.

The aluminosilicates used in the present invention are synthetic crystalline aluminosilicates, commonly called 'zeolites.' Zeolites are materials with discreet channels and cages that allow the diffusion of small molecules into and out of their crystalline structures. The utility of these materials lies in their microstructures that allow access to large internal surface areas and that increase adsorptive and ion exchange capacity.

The aluminosilicates or zeolites useful in the present invention may be generally designated by the chemical formula $M_{2/n}O.Al_2O_3.ySiO_2.wH_2O$ in which M is a charge balancing cation, n is the valence of M and is 1 or 2, y is the number of moles of $SiO_2$ and is 1.8 to 15, and w is the number of moles of water of hydration per molecule of the aluminosilicate.

Suitable charge balancing cations represented by M in the formula include such cations as sodium, potassium, zinc, magnesium, calcium, tetra-alkyl and/or -aryl ammonium, lithium, $NH_4$, Ag, Cd, Ba, Cu, Co, Sr, Ni, Fe, and mixtures thereof. The preferred cations are alkali metal and/or alkaline earth metal cations, with the proviso that, when M is a mixture of alkali or alkaline earth metals comprising sodium and potassium and/or calcium, the preferred potassium and/or calcium content is less than 35% by weight of the total alkali or alkaline earth metal content.

While the number of moles of $SiO_2$ per molecule of aluminosilicate, represented in the formula by y, may be in the 1.8 or greater, it is suitably 1.85 to 15, more suitably 1.85 to 10, preferably in the range of about 2 to 5.

The number of moles of water in the zeolite as water of hydration, represented in the formula by w, is suitably greater than about 0.1, more suitably in the range of about 0.1 to about 10.

The zeolite framework is made up of $SiO_4$ tetrahedra linked by shared oxygen atoms. Substitution of aluminum for silicon creates a charge imbalance that requires a non-framework cation to balance the charge. These cations, which are contained inside the channels and cages of these materials, may be replaced by other cations giving rise to ion-exchange properties. The water in these materials may typically be reversibly removed leaving the host structure intact, although some framework distortion may occur. In addition, these materials are typically alkaline. Suspensions of low $SiO_2/Al_2O_3$ ratio materials in water often give rise to pH's greater than nine. This combination of high alkalinity and the pore structure of these compounds is believed to be largely responsible for the ability of these zeolites to stabilize halogenated polymers by neutralizing acids released during processing and creating inert salts and/or scavenging excess cationic metals.

Zeolites are frequently categorized by their crystalline unit cell structure (See W. M. Meier, D. H. Olson, and Ch. Baerlocher, *Atlas of Zeolite Structure Types*, Elsevier Press (1996) 4th ed.) Those suitable for use as stabilizers in the present invention include compounds characterized as zeolite A, zeolite P, zeolite X, and zeolite Y. While other zeolites may also be useful in the present invention, the preferred aluminosilicate is zeolite A.

Preferably, there is employed a zeolite which is substantially anhydrous; that is, an aluminosilicate in which much of the water of hydration has been removed by dehydration prior to incorporation into the halogenated polymer formulation. Such products are frequently referred to by those skilled in the art as "activated zeolites." Suitable activated zeolites particularly useful in the present invention are those which have been dehydrated to a level at which the water content threof is in the range of 0.1% to about 20%, advantageously in the range of 0.5% to 18% and most conveniently between about 1% and and about 15%, by weight of the aluminosilicate.

It is also desirable that the aluminosilicate have a mean particle size in the range of about 0.1 to 10 microns, suitably wherein at least 90% of the particles are less than 50 $\mu$m, advantageously less than 25 $\mu$m, and most suitably less than about 10 $\mu$m. It is also desirable that the aluminosilicate have an mean micropore diameter in the range of 2.8 to 8 angstroms, and/or an external surface area in the range of 3 to 300 m$^2$/g.

As previously indicated, the above identified aluminosilicates may suitably be formulated with the halogenated polymer and with a co-stabilizer conventionally employed for stabilization of PVC resins. Suitable stabilizers include an organometallic complex such as magnesium, antimony, cadmium, barium, tin, calcium, zinc and/or lead, an organic complex such as polyhydric esters of various fatty acids, $\beta$-diketones, organic phosphites, hindered amines, organic mercaptans, epoxidized oils, epoxy compounds and/or phenols, inorganic complexes such as dibasic, tribasic and/or tetrabasic lead sulfate, dibasic lead phosphite, and/or white lead, and/or various combinations of such organo metallic, organic and inorganic complexes.

In accordance with the method aspect of the invention, there is provided a method for stabilizing a halogenated polymer resin comprising compounding the resin with a stabilizer comprising a synthetic crystalline aluminosilicate of the formula $M_{2/n}O \cdot Al_2O_3 \cdot ySiO_2 \cdot wH_2O$, in which M, n, y and w are as defined above, wherein said aluminosilicate has a mean crystallite size in the range of about 0.01 μm to about 1 μm. In carrying out the process aspect of this invention, the aluminosilicate may be admixed with the polymer during production by admixing the aluminosilicate with monomers of the resin before, during or after polymerization. As with the composition aspect of this invention, it is also preferred that the aluminosilicate have a mean particle size in the range of about 0.1 to about 10 μm.

While degree of hydration, nature of the exchangeable cations, selection of co-stabilizer(s), and pore diameter are known be important considerations in the ability of aluminosilicates to impart thermal stability to halogenated polymers, crystallite size has now been found to be the critical factor in obtaining further improvements in the ability of aluminosilicates to impart further thermal stability. Surprisingly, simply grinding larger particle size material into a finer particle size does not contribute significantly to these improvements. Rather the size of the crystallite itself, as opposed to the aggregated particles of crystallites, must be reduced to within the above stated range in order to obtain these improvements in stability. This reduction in crystallite size may be achieved in the process of manufacturing the aluminosilicate by utilizing a solution containing nuclei to control crystal growth (Solution A) during production of the aluminosilicate, as shown in the detailed preparatory examples set forth below.

EXAMPLE 1

Synthesis of Solution A

Reagent grade sodium hydroxide pellets (316.3 g) were added to deionized (316.3 g) water and stirred until the solution was clear. This solution was then heated until it boiled and aluminum trihydrate (63.1 g) was slowly added to the stirred solution until it dissolved. The solution was then cooled below 100° C. and deionized water (1090.4 g) was added. A 2.0 ratio sodium silicate (1,237.5 g, $SiO_2/Na_2O$=2.0, 56 wt. % water) solution was slowly added to the stirred aluminate and aged for at least 12 hours before use.

Synthesis of Fine Crystallite 4A Zeolite—Example 1B

Reagent grade sodium hydroxide pellets (203.5 g) were added to deionized (203.5g) water and stirred until the solution was clear. This solution was then heated until it boiled and aluminum trihydrate (162.0 g) was slowly added to the heated stirred solution until it dissolved. The solution was then cooled below 100° C., diluted with deionized water (180 g), and further cooled to 60° C.

Separately, a 2.0 ratio sodium silicate (395 g, $SiO_2/Na_2O$=2.0, 56 wt. % water) solution was diluted with deionized water (1,615 g) and stirred until homogeneous. Over 15 minutes, the aluminate solution from the preceding paragraph was added to this solution using low agitation. Solution A described above (38.7 g) was then stirred into the solution. The mixture was placed into a water bath, heated to 94° C., and stirred at temperature for about one hour.

The resulting slurry was filtered and re-slurried in ambient temperature deionized water (1.0 liter, pH adjusted to 10.5 using NaOH) and filtered. This washing process was repeated one more time and the powder was dried at 100° C. for about 12 hours.

Example 1B is summarized in Table 1 below, together additional samples (Examples 1A and 1C) prepared using the same procedure substituting the quantities of reagents shown in Table 1.

TABLE 1

Synthesis of Small Crystallite 4A Zeolites

| INGREDIENTS | Example 1A | Example 1B | Example 1C |
| --- | --- | --- | --- |
| 2.0 Silicate (g) | 382 | 354 | 271 |
| $H_2O$-silicate (g) | 1,565 | 1,550 | 1,550 |
| NaOH (50 wt. %) (g) | 400 | 388 | 352 |
| ATH (g) | 162 | 162 | 162 |
| Solution A (g) | 77.4 | 155 | 387 |
| $H_2O$ - aluminate (g) | 220 | 225 | 200 |
| Total Weight (g) | 2,806.4 | 2,834 | 2,922 |
| Mean Crystal Size (μm) | 0.6 | 0.4 | 0.3 |

The following examples 2A, 2B and 3 are laboratory preparations prepared generally by adaptation of the procedures described in *Zeolite Molecular Sieves*, D. Breck, Krieger Publishing Company, Malabar, Fla., Chapter 4, pp. 260–274.

EXAMPLE 2A

Synthesis of 4A Zeolite

Reagent grade sodium hydroxide pellets (207 g) were added to deionized (207 g) water and stirred until the solution was clear. This solution was then heated until it boiled and aluminum trihydrate (162.0 g) was slowly added to the stirred solution until it dissolved. The solution was then allowed to cool below 100° C., deionized water (240 g) was added, and it was allowed to cool to 60° C.

A 2.0 ratio sodium silicate (408 g, $SiO_2/Na_2O$=2.0, 56 wt. % water) solution was then diluted with deionized water (1,130 g) and stirred until homogeneous. Over 15 minutes, this solution was added to the aluminate using low agitation. The mixture was then placed into a water bath, heated to 94° C., and stirred at temperature for about one hour.

The resulting slurry was filtered and re-slurried in ambient temperature deionized water (1.0 liter, pH adjusted to 10.5 using NaOH) and filtered. This washing process was repeated one more time and the powder was dried at 100° C. for about 12 hours.

The resulting zeolyte crystals had a mean crystallite size of 3.0 μm and a mean particle size of 6.53 μm.

EXAMPLE 2B

Synthesis of 4A Zeolite

Reagent grade sodium hydroxide pellets (207 g) were added to deionized (207 g) water and stirred until the solution was clear. This solution was then heated until it boiled and aluminum trihydrate (162.0 g) was slowly added to the stirred solution until it dissolved. The solution was then allowed to cool below 100° C., deionized water (240 g) was added, and it was allowed to cool to 60° C.

A 2.0 ratio sodium silicate (408 g, $SiO_2/Na_2O$=2.0, 56 wt. % water) solution was then diluted with deionized water (1,130 g) and stirred until homogeneous. The aluminate was added to this solution over 15 minutes using low agitation. The mixture was then placed into a water bath, heated to 94° C., and stirred at temperature for about one hour.

The resulting slurry was filtered and re-slurried in ambient temperature deionized water (1.0 liter, pH adjusted to 10.5 using NaOH) and filtered. This washing process was repeated one more time and the powder was dried at 100° C. for about 12 hours.

The resulting product had a mean crystallite size of 1.25 μm and a mean particle size of 3.07 μm.

TABLE 2

Synthesis of 4A Zeolites

| INGREDIENTS | Example 2A | Example 2B |
|---|---|---|
| Addition Order | | |
| 2.0 Silicate (g) | 408 | 408 |
| H$_2$O - silicate (g) | 1,130 | 1,130 |
| NaOH (50 wt. %) (g) | 414 | 414 |
| ATH (g) | 162 | 162 |
| H$_2$O - aluminate (g) | 240 | 240 |
| Total Weight (g) | 2,354 | 2,354 |
| Mean Crystal Size (μm) | 3.0 | 1.25 |

EXAMPLE 3

Synthesis of Small Crystal 13X Zeolite

A solution of 50 weight % NaOH (141 g) was heated until it boiled and aluminum trihydrate (81 g) was slowly added to the stirred solution until it dissolved. The solution was then allowed to cool below 100° C., deionized water (55 g) was added, and it was allowed to cool to ambient temperature.

A 3.2 ratio sodium silicate (194 g, SiO$_2$/Na$_2$O=3.2, 62 wt. % water) solution was then diluted with deionized water (901 g) water and stirred until homogeneous. To this solution, over 15 minutes, the aluminate was added using low agitation. Solution A (387.5 g) described above was then added to the solution. The mixture was then placed into a water bath, heated to 94° C., and left at temperature for about six hours.

The resulting slurry was filtered and re-slurried in ambient temperature deionized water (2.0 liters, pH adjusted to 10.5 using NaOH) and filtered. This washing process was repeated one more time and the powder was dried at 100° C. for about 12 hours. This is Example 3D below.

Additional examples, 3A–3C, were prepared using a similar procedure with varying amounts of Solution A. Crystal sizes are summarized in Table 3.

TABLE 3

Synthesis of Small Crystal 13X Zeolite

| INGREDIENTS | Example 3A | Example 3B | Example 3C | Example 3D |
|---|---|---|---|---|
| Mean Crystal Size (μm) | 0.4 | 0.3 | 0.2 | 0.2 |

EXAMPLE 4

Samples of 4A zeolite varying in crystallite size were compounded into plasticized PVC formulations as shown in Table 4. The formulations for each set of tests were prepared from a common master batch and the indicated amount of zeolite was then added. The master batch was prepared as follows: A Henschel high intensity laboratory mixer was preheated to about 77° C. The PVC resin (1,200 g) and epoxidized soybean oil (ESO) were then charged and the mix was agitated at 3000 RPM. When the blend reached 70° C., the di-octyl pthalate (DOP) plasticizer was slowly added. At 75° C., zinc stearate and oxidized polyethylene wax were added and at 80° C., the blend was cooled and agitation was reduced to about 1900 RPM. The mixer was emptied when the temperature dropped below 45° C.

The zeolite was then added to each formulation as follows: PVC master batch (300 g) and zeolite (0.59 g) were added to a food processing mixer. The powder blend was mixed for 15 minutes.

The thermal stability testing of the powder PVC compounds was performed using the Dynamic Thermal Stability (DTS) test. (ASTM method D 2538-95) DTS is defined in the following examples as the time required to reach a 20% increase in torque after equilibrium torque has been established. The DTS test was done using a Haake torque rheometer at the following conditions: 190° C., 100 RPM, and 63 g samples.

TABLE 4

Formulations and Properties

| | Formulations (phr*) | | | | |
|---|---|---|---|---|---|
| Ingredients | 1 | 2 | 3 | 4 | 5** |
| PVC resin (Oxy 230, K = 68) | 100 | 100 | 100 | 100 | 100 |
| DOP (Akcros) | 50 | 50 | 50 | 50 | 50 |
| Zinc stearate (Aldrich) | 0.3 | 0.3 | 0.3 | 0.3 | 0.3 |
| Epoxidized soybean oil D-81 (Henkel) | 2 | 2 | 2 | 2 | 2 |
| Oxidized PE wax AC629A (Allied Signal) | 0.2 | 0.2 | 0.2 | 0.2 | 0.2 |
| Example 1C | 0.3 | | | | |
| Example 1B | | 0.3 | | | |
| Example 2B | | | 0.3 | | |
| Example 2A | | | | 0.3 | |
| DTS (min.) | 19 | 19 | 14 | 8 | 3.6 |
| Zeolite Properties | | | | | |
| Mean crystallite size (μm) | 0.3 | 0.4 | 1.25 | 3.0 | — |
| Cryogenic multi-point N$_2$ BET surface area (m2/g) | 18 | 8 | 3 | 1 | — |
| Mean particle size (μm) | 2.94 | 4.49 | 3.07 | 6.53 | — |
| Relative crystallinity (%) | 98 | 100 | 100 | 100 | — |

*parts per hundred parts resin
**Control containing no zeolite

As observed from data in Table 4, performance of 4A zeolite as a stabilizer is significantly improved when the size of the crystallites is reduced from 3 to 0.4 μm. Further reduction of the crystal size increases the external surface area, but does not improve its performance as a stabilizer. No direct correlation with particle size is observed.

EXAMPLE 5

This example demonstrates the relative effects of particle size reduction using large and small crystallite 4A zeolite on its performance as a stabilizer for PVC. The 4A zeolites described in Example 2 were milled using a micronizer™ jet mill at 120 psi to reduce their particle size. The zeolites were then compounded into the plasticized PVC formulation as in Example 4 and tested at the same conditions. Example 5 formulations and testing results are shown below in Table 5.

TABLE 5

Formulations and Properties

| Ingredients | Formulations (phr) | | | | |
|---|---|---|---|---|---|
| | 1 | 2 | 3 | 4 | 5 |
| PVC Resin (Oxy 230) | 100 | 100 | 100 | 100 | 100 |
| DOP (Akcros) | 50 | 50 | 50 | 50 | 50 |
| Zn Stearate (Aldrich) | 0.3 | 0.3 | 0.3 | 0.3 | 0.3 |
| ESO D-81 (Henkel) | 2 | 2 | 2 | 2 | 2 |
| Oxidized PE Wax AC629A (Allied Signal) | 0.2 | 0.2 | 0.2 | 0.2 | 0.2 |
| Advera ™ 401P* | 0.3 | | | | |
| Advera ™ 401P (milled once) | | 0.3 | | | |
| Example 1B | | | 0.3 | | |
| Example 1B (milled once) | | | | 0.3 | |
| Example 1B (milled twice) | | | | | 0.3 |
| DTS (min.) | 10.4 | 9.6 | 20.0 | 19.1 | 18.2 |
| Zeolite mean particle size ($\mu$m) | 2.91 | 2.34 | 4.78 | 2.30 | 1.75 |
| Zeolite mean crystallite size ($\mu$m) | 1.2 | 1.2 | 0.4 | 0.4 | 0.4 |

*For comparative purposes, Advera ™ 401P, a commercial 4A aluminosilicate zeolite, was used. Advera ™ is a trademark of the PQ Corporation.

As observed from the data in Table 5, reduction of particle size does not improve the performance of 4A zeolite as a PVC stabilizer for either small or large crystallite zeolites.

EXAMPLE 6

Example 6 demonstrates the effect of reducing the crystallite size of the faujasite structure zeolite 13X on its performance as a stabilizer for PVC. The X zeolites were compounded into a flexible PVC formulation and tested as in Example 4. Metrastat™ static heat stability tests were performed using the Metrastat™ oven according to DIN 538 IF and AFNOR T51-224 at 190° C. for 2 hours. The formulations were extruded at 175° C. stock temperature using a Haake™ twin screw extruder to make 1×0.04-inch strips for the testing. Metrastat™ early color for the following examples is defined as the time to observable color change and Metrastat™ stability is defined as the time to complete degradation observed as a color change to dark brown or black. Table 6 shows the formulations and testing results.

TABLE 6

Formulations and Properties

| Ingredients | Formulations (phr) | | | | | |
|---|---|---|---|---|---|---|
| | 1 | 2 | 3 | 4 | 5 | 6 |
| PVC Resin (Oxy 230) | 100 | 100 | 100 | 100 | 100 | 100 |
| DOP (Akcros) | 50 | 50 | 50 | 50 | 50 | 50 |
| Zin Stearate (Aldrich) | 0.3 | 0.3 | 0.3 | 0.3 | 0.3 | 0.3 |
| ESO D-81 (Henkel) | 2 | 2 | 2 | 2 | 2 | 2 |
| Oxidized PE Wax AC629A (Allied Signal) | 0.2 | 0.2 | 0.2 | 0.2 | 0.2 | 0.2 |
| Example 1B | 0.3 | | | | | |
| Example Advera ™ 201* | | 0.3 | | | | |
| Example 3A | | | 0.3 | | | |
| Example 3B | | | | 0.3 | | |
| Example 3C | | | | | 0.3 | |
| Example 3D | | | | | | 0.3 |
| DTS (min.) | 18.2 | 6.6 | 9.2 | 11 | 10.6 | 11.2 |
| Metrastat ™ early color hold (min.) | 73 | 60.5 | 65.8 | 66.8 | 69.8 | — |
| Metrastat ™ stability (min.) | 95.3 | 61.8 | 67 | 71.5 | 78 | — |
| Zeolite mean particle size ($\mu$m) | 4.7 | 5.64 | 12.2 | 10.5 | 15.8 | 8.4 |
| Zeolite mean crystal size ($\mu$m) | 0.4 | 3.0 | 0.4 | 0.3 | 0.2 | 0.2 |

*For comparative purposes, Advera ™ 201, a commercial 13X aluminosilicate zeolite, was used. Advera ™ is a trademark of the PQ Corporation.

Analysis of results from Table 6 demonstrates that reduction of X zeolite crystallite size improves its performance as a PVC stabilizer. However, no direct correlation with particle size is observed.

EXAMPLE 7

Example 7 shows performance of small crystallite Zeolite A and 13X at higher stabilizer loading. The plasticized PVC compounds were prepared and tested at conditions shown in Example 4. Presented below is Table 7, which lists the prepared PVC formulations and their properties.

TABLE 7

Formulations and Properties

| Ingredients | Formulations (phr) | | | | | |
|---|---|---|---|---|---|---|
| | 1 | 2 | 3 | 4 | 5 | 6 |
| PVC Resin (Oxy 230) | 100 | 100 | 100 | 100 | 100 | 100 |
| DOP (Akcros) | 50 | 50 | 50 | 50 | 50 | 50 |
| Zn Stearate (Aldrich) | 0.3 | 0.3 | 0.3 | 0.3 | 0.3 | 0.3 |
| ESO D-81 (Henkel) | 2 | 2 | 2 | 2 | 2 | 2 |
| Oxidized PE Wax AC629A (Allied Signal) | 0.2 | 0.2 | 0.2 | 0.2 | 0.2 | 0.2 |
| Example 1B | 0.3 | 0.45 | | | | |
| Example 3B | | | 0.3 | 0.45 | | |
| Example 3C | | | | | 0.3 | 0.45 |
| DTS (min.) | 16.4 | 25 | 11.9 | 16.4 | 11.3 | 14.7 |

As shown in Table 7, increased levels of zeolite A and X improve DTS of the PVC formulation. However, zeolite A is preferred.

EXAMPLE 8

Example 8 compares the performance of other zeolites as stabilizers for PVC. The PVC formulations were prepared and tested as described in Example 4. Their evaluations are described in Table 8 below.

TABLE 8

Formulations and Properties

| Ingredients | Product Description | Formulations (phr) | | | | | |
|---|---|---|---|---|---|---|---|
| | | 1 | 2 | 3 | 4 | 5 | 6 |
| PVC Resin (Oxy 230) | | 100 | 100 | 100 | 100 | 100 | 100 |
| DOP (Akcros) | | 50 | 50 | 50 | 50 | 50 | 50 |

TABLE 8-continued

Formulations and Properties

| Ingredients | Product Description | Formulations (phr) | | | | | |
|---|---|---|---|---|---|---|---|
| | | 1 | 2 | 3 | 4 | 5 | 6 |
| Zn Stearate (Aldrich) | | 0.3 | 0.3 | 0.3 | 0.3 | 0.3 | 0.3 |
| ESO D-81 (Henkel) | | 2 | 2 | 2 | 2 | 2 | 2 |
| Oxidized PE Wax AC629A (Allied Signal) | | 0.2 | 0.2 | 0.2 | 0.2 | 0.2 | 0.2 |
| Example 1B | | 0.3 | 0.45 | | | | |
| *Zeolyst CP 500C-11 | Na Mordenite | | | 0.3 | 0.45 | | |
| Sodalite | | | | | | 0.3 | |
| MAP | Low $SiO_2$/ $Al_2O_3$ P zeolite | | | | | | 0.3 |
| DTS (min.) | | 13.3 | 22.5 | 4.6 | 4.7 | 6.7 | 5.6 |

*Zeolyst ™ is a trademark of Zeolyst International

The results in Table 8 demonstrate that not all zeolites perform equally as stabilizers for PVC. Zeolite A is the preferred zeolite.

EXAMPLE 9

Example 9 demonstrates the effect of thermally activating zeolite 4A. The zeolites, having 1.5 and 0.4 μm crystal sizes, were heated for four hours at the temperatures shown below. The moisture level in the zeolite A samples were tested by loss on ignition (LOI) at 1000° C. The PVC formulations were prepared and tested as described in Example 4. Table 9 lists the PVC formulations and their properties.

TABLE 9

Formulations and Properties

| Ingredients | Formulations (phr) | | | | | | | | | |
|---|---|---|---|---|---|---|---|---|---|---|
| | 1 | 2 | 3 | 4 | 5 | 6 | 7 | 8 | 9 | 10 |
| PVC Resin (Oxy 230) | 100 | 100 | 100 | 100 | 100 | 100 | 100 | 100 | 100 | 100 |
| DOP (Akcros) | 50 | 50 | 50 | 50 | 50 | 50 | 50 | 50 | 50 | 50 |
| Zn Stearate (Aldrich) | 0.3 | 0.3 | 0.3 | 0.3 | 0.3 | 0.3 | 0.3 | 0.3 | 0.3 | 0.3 |
| ESO D-81 (Henkel) | 2 | 2 | 2 | 2 | 2 | 2 | 2 | 2 | 2 | 2 |
| Oxidized PE Wax AC629A (Allied Signal) | 0.2 | 0.2 | 0.2 | 0.2 | 0.2 | 0.2 | 0.2 | 0.2 | 0.2 | 0.2 |
| Advera ™ 401P* | 0.3 | | | | | | | | | |
| Advera ™ 401P - 100 deg. C. | | 0.3 | | | | | | | | |
| Advera ™ 401P - 200 deg. C. | | | 0.3 | | | | | | | |
| Advera ™ 401P - 300 deg. C. | | | | 0.3 | | | | | | |
| Advera ™ 401P - 500 deg. C. | | | | | 0.3 | | | | | |
| Example 1B | | | | | | 0.3 | | | | |
| Example 1B - 100 deg. C. | | | | | | | 0.3 | | | |
| Example 1B - 200 deg. C. | | | | | | | | 0.3 | | |
| Example 1B - 300 deg. C. | | | | | | | | | 0.3 | |
| Example 1B - 500 deg. C. | | | | | | | | | | 0.3 |
| DTS (min.) | 8.4 | 10.6 | 12.4 | 12.3 | 13.0 | 20.5 | 21.0 | 22.3 | 21.7 | 16.7 |
| Zeolite LOI (wt. %) | 21.0 | 15.1 | 5.4 | 4.2 | 1.8 | 21.5 | 15.1 | 5.0 | 4.0 | 1.9 |

*For comparative purposes, Advera ™ 401P, a commercial 4A aluminosilicate zeolite, was used. Advera ™ is a trademark of the PQ Corporation.

The results in Table 9 demonstrate that the level of hydration of 4A zeolite influences its performance as a PVC stabilizer. Optimal ranges are from about 4% to 22%.

EXAMPLE 10

Example 10 demonstrates the performance of Example 1B where a portion of the exchangeable sodium cations was replaced with potassium. The samples were prepared using conventional ion exchange methods. (*Zeolite Molecular Sieves*, D. Breck, Krieger Publishing Company, Malabar, Fla. Chapter 7, pp 537–549) The potassium exchanged A zeolites were compounded into flexible PVC formulation and tested as in Example 4 and are shown below in Table 10.

TABLE 10

Formulations and Properties

| Ingredients | K Exchange Level (mol. %) | Formulations (phr) | | | | |
|---|---|---|---|---|---|---|
| | | 1 | 2 | 3 | 4 | 5 |
| PVC Resin (Oxy 230) | | 100 | 100 | 100 | 100 | 100 |
| DOP (Akcros) | | 50 | 50 | 50 | 50 | 50 |
| Zinc Stearate (Aldrich) | | 0.3 | 0.3 | 0.3 | 0.3 | 0.3 |
| ESO D-81 (Henkel) | | 2 | 2 | 2 | 2 | 2 |
| Oxidized PE Wax AC629A (Allied Signal) | | 0.2 | 0.2 | 0.2 | 0.2 | 0.2 |
| *Advera ™ 401P | | 0.3 | | | | |
| Example 1B | 3.9 | | 0.3 | | | |
| Example 1B | 9.2 | | | 0.3 | | |
| Example 1B | 39.3 | | | | 0.3 | |
| Example 1B | 76.2 | | | | | 0.3 |
| DTS (min.) | | 10.2 | 16.3 | 16.9 | 12.0 | 8.8 |
| Metrastat ™ early color hold (min.) | | 65.1 | 64.8 | 66.5 | 63.6 | 64.3 |

*For comparative purposes, Advera ™ 401P, a commercial 4A aluminosilicate zeolite, was used. Advera ™ is a trademark of the PQ Corporation.

EXAMPLE 11

Example 11 demonstrates the performance of Advera 401P and Example 1B where a portion of the exchangeable sodium cations was replaced with calcium. The samples were prepared using conventional ion exchange methods. (*Zeolite Molecular Sieves*, D. Breck, Chapter 7, pp 537–549) The calcium exchanged A zeolites were compounded into flexible PVC formulation and tested as in Example 4 and are shown below in Table 11.

TABLE 11

Formulations and Properties

| Ingredients | Ca Exchange Level (mol. %) | Formulations (phr) | | | | | | | | |
| --- | --- | --- | --- | --- | --- | --- | --- | --- | --- | --- |
| | | 1 | 2 | 3 | 4 | 5 | 6 | 7 | 8 | 9 |
| PVC Resin (Oxy 230) | | 100 | 100 | 100 | 100 | 100 | 100 | 100 | 100 | 100 |
| DOP (Akcros) | | 50 | 50 | 50 | 50 | 50 | 50 | 50 | 50 | 50 |
| Zn Stearate (Aldrich) | | 0.3 | 0.3 | 0.3 | 0.3 | 0.3 | 0.3 | 0.3 | 0.3 | 0.3 |
| ESO D-81 (Henkel) | | 2 | 2 | 2 | 2 | 2 | 2 | 2 | 2 | 2 |
| Oxidized PE Wax AC629A (Allied Signal) | | 0.2 | 0.2 | 0.2 | 0.2 | 0.2 | 0.2 | 0.2 | 0.2 | 0.2 |
| Advera ™ 401P* | 0 | 0.3 | | | | | | | | |
| Advera ™ 401P | 3.5 | | 0.3 | | | | | | | |
| Advera ™ 401P | 7.1 | | | 0.3 | | | | | | |
| Advera ™ 401P | 34.0 | | | | 0.3 | | | | | |
| Advera ™ 401P | 76.3 | | | | | 0.3 | | | | |
| Example 1B | 3.5 | | | | | | 0.3 | | | |
| Example 1B | 7.2 | | | | | | | 0.3 | | |
| Example 1B | 35.9 | | | | | | | | 0.3 | |
| Example 1B | 68.4 | | | | | | | | | 0.3 |
| DTS (min.) | | 9.6 | 10.0 | 8.9 | 5.8 | 4.3 | 14.6 | 16.5 | 8.6 | 6.2 |

*For comparative purposes, Advera ™ 401P, a commercial 4A aluminosilicate zeolite, was used: Advera ™ is a trademark of the PQ Corporation.

We claim:

1. A stabilized halogenated polymer composition comprising a halogenated polymer resin and a stabilizer comprising a synthetic crystalline aluminosilicate of the formula $M_{2/n}O.Al_2O_3.ySiO_2.wH_2O$, in which M is a charge balancing cation, n is the valence of M and is 1 or 2, y is the number of moles of $SiO_2$ and is 1.8 to 15, and w is the number of moles of water of hydration per molecule of said aluminosilicate, wherein said aluminosilicate has a mean crystallite size in the range of about 0.01 µm to about 1 µm.

2. The stabilized halogenated polymer composition of claim 1 in which M is a charge balancing cation selected from the group consisting of sodium, potassium, zinc, magnesium, calcium, tetraalkyl ammonium, tetraaryl ammonium, lithium, $NH_4$, Ag, Cd, Ba, Cu, Co, Sr, Ni, Fe, and mixtures thereof.

3. The stabilized halogenated polymer composition of claim 1 in which M is a charge balancing cation selected from the group consisting of alkali metal and alkaline earth metal, with the proviso that, when M is a mixture of alkali metal and alkaline earth metal comprising sodium and potassium or calcium, the potassium and calcium content is less than 35% of the total alkali and alkaline earth metal content.

4. The stabilized halogenated polymer composition of claim 1 in which, y is in the range of about 2 to 5, wherein said aluminosilicate has a mean crystallite size in the range of about 0.01 µm to about 1 µm and a mean particle size in the range of about 0.1 to 10 µm.

5. The composition of claim 1, in which the halogenated polymer resin is selected from the group consisting of polyvinyl chloride (PVC), chlorinated polyvinyl chloride (CPVC), polychloroprene (Neoprene), an acrylonitrile-vinyl chloride copolymer (Dynel), a polyvinyl chloride-vinyl acetate copolymer, polyvinylidene chloride, a polytetrafluoroethylene-vinyl chloride copolymer, and a polyfluoro-chloro ethylene polymer.

6. The composition of claim 1 in which the halogenated polymer resin comprises a halogenated-vinyl polymer resin.

7. The composition of claim 6 in which the halogenated-vinyl polymer resin is selected from polyvinyl chloride or chlorinated polyvinyl chloride.

8. The composition of claim 7 in which said polymer resin is polyvinyl chloride.

9. The composition of claim 8 in which the polyvinyl chloride has a number average molecular weight in the range of 20,000 to 100,000 and a Fikentscher K value in the range of 41 to 98 made by any conventional polymerization method.

10. The composition of claim 1 in which said aluminosilicate is a zeolite selected from the group consisting of zeolite A, zeolite P, zeolite X, zeolite Y, and mixtures thereof.

11. The composition of claim 10 in which said aluminosilicate is zeolite A.

12. The composition of claim 10 in which said zeolite is dehydrated to a water content between 0.1% and 20% by weight of the aluminosilicate.

13. The composition of claim 10 in which the zeolite has an average pore diameter in the range of 2.8 to 8 angstroms.

14. The composition of claim 10 in which the zeolite has an external surface area in the range of 3 to 300 $m^2/g$.

15. The composition of claim 1 in which the stabilizer is, in combination, the aluminosilicate and one or more co-stabilizers.

16. The composition of claim 15 in which the co-stabilizer is a conventional organometallic complex stabilizer selected from the group consisting of magnesium, antimony, cadmium, barium, tin, calcium, zinc and lead, a conventional organic complex stabilizer selected from the group consisting of polyhydric esters of various fatty acids, beta-diketones, organic phosphites, hindered amines, organic mercaptans, epoxidized oils, epoxy compounds, and phenols, a conventional inorganic complex stabilizer selected from the group consisting of dibasic, tribasic, and tetrabasic lead sulfate; dibasic lead phosphite; white lead, and mixtures thereof.

17. A method for stabilizing a halogenated polymer resin comprising admixing the resin with: a stabilizer comprising a synthetic crystalline aluminosilicate of the formula $M_{2/n}O.Al_2O_3.ySiO_2.wH_2O$, in which M is a charge balancing cation selected from the group consisting of sodium, potassium, magnesium, lithium, zinc, calcium, tetraalkyl ammonium, tetraaryl ammonium, and mixtures thereof, with the proviso that, when M is a mixture of alkali metals and alkaline earth metals comprising sodium and potassium or calcium, the potassium and calcium content is not more than 35% of the total alkali metal and alkaline earth content, n is the valence of M and is 1 or 2, y is the number of moles of $SiO_2$ and is 1.85 to 10, and w is the moles of water of hydration per molecule of said aluminosilicate, wherein said aluminosilicate has a mean crystallite size in the range of about 0.01 μm to about 1 μm.

18. The method of claim 17 in which said aluminosilicate has a mean particle size in the range of about 0.1 to 10 μm.

19. The method of claim 17 in which y is in the range of 2 to 5.

20. The method of claim 17, in which the halogenated polymer resin comprises a member selected from the group consisting of polyvinyl chloride (PVC), chlorinated polyvinyl chloride (CPVC), polychloroprene (Neoprene), an acrylonitrile-vinyl chloride copolymer (Dynel), a polyvinyl chloride-vinyl acetate copolymer, polyvinylidene chloride, a polytetrafluoroethylene-vinyl chloride copolymer, and a polyfluoro-chloro ethylene polymer.

21. The method of claim 17 in which the halogenated polymer resin is a halogenated-vinyl polymer resin.

22. The method of claim 17 in which the halogenated-vinyl polymer resin is selected from polyvinyl chloride or chlorinated polyvinyl chloride.

23. The method of claim 17 in which said polymer resin is polyvinyl chloride.

24. The method of claim 23 in which the polyvinyl chloride has a number average molecular weight in the range of 20,000 to 100,000 and a Fikentscher K value in the range of 41 to 98 made by any conventional polymerization method.

25. The method of claim 17 in which said aluminosilicate is a zeolite selected from the group consisting of zeolite A, zeolite P, zeolite X, zeolite Y, and mixtures thereof.

26. The method of claim 25 in which said aluminosilicate is zeolite A.

27. The method of claim 25 in which said zeolite is dehydrated to a water content within a range of 0.1% to 20% by weight of the aluminosilicate.

28. The method of claim 25 in which the zeolite has an average pore diameter in the range of 2.8 to 8 angstroms.

29. The method of claim 25 in which the zeolite has an external surface area in the range of 3 to 300 $m^2/g$.

30. The method of claim 17 in which the said stabilizer is, in combination, the aluminosilicate and a co-stabilizer.

31. The method of claim 30 in which the co-stabilizer is a conventional organometallic complex selected from the group consisting of cadmium, magnesium, antimony, barium, tin, calcium, zinc, lead and mixtures thereof, a conventional organic complex selected from the group consisting of polyhydric esters of various fatty acids, beta-diketones, organic phosphites, hindered amines, organic mercaptans, and phenols, a conventional inorganic complex selected from the group consisting of dibasic, tribasic, and tetrabasic lead sulfate; dibasic lead phosphite, and white lead, and mixtures thereof.

32. The method of claim 17, wherein said mixing takes place before, during or after polymerization of said resin.

* * * * *